United States Patent
Li (10) Patent No.: US 9,297,455 B2
(45) Date of Patent: Mar. 29, 2016

(54) GPS-BASED PREDICTIVE SHIFT SCHEDULE FOR AUTOMATIC TRANSMISSION

(71) Applicant: GM GLOBAL TECHNOLOGY OPERATIONS LLC, Detroit, MI (US)

(72) Inventor: Dongxu Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 131 days.

(21) Appl. No.: 13/681,475

(22) Filed: Nov. 20, 2012

(65) Prior Publication Data

US 2014/0142822 A1 May 22, 2014

(51) Int. Cl.
G06F 7/00 (2006.01)
F16H 61/00 (2006.01)
F16H 61/02 (2006.01)
F16H 59/66 (2006.01)

(52) U.S. Cl.
CPC ............ *F16H 61/00* (2013.01); *F16H 61/0213* (2013.01); *F16H 2059/666* (2013.01); *F16H 2061/0216* (2013.01)

(58) Field of Classification Search
CPC ............... F16H 61/0213; F16H 61/16; F16H 2061/022; F16H 2061/0223
USPC .......... 701/55, 56, 65, 51, 53, 54, 58, 64, 87, 701/469
See application file for complete search history.

(56) References Cited

U.S. PATENT DOCUMENTS

| | | | | |
|---|---|---|---|---|
| 6,199,001 B1* | 3/2001 | Ohta et al. | ...................... | 701/55 |
| 6,269,296 B1* | 7/2001 | Toukura | ................ | B60W 10/06 |
| | | | | 701/65 |
| 2002/0049116 A1* | 4/2002 | Shiiba | ...................... | F16H 59/66 |
| | | | | 477/97 |
| 2004/0068359 A1* | 4/2004 | Neiss | ................. | B60K 31/0058 |
| | | | | 701/96 |
| 2008/0319620 A1* | 12/2008 | Fakler | ................. | F16H 61/0213 |
| | | | | 701/56 |
| 2010/0030437 A1* | 2/2010 | Kim | ..................... | F16H 61/0213 |
| | | | | 701/65 |
| 2010/0256883 A1* | 10/2010 | Sauter | ..................... | F16H 61/10 |
| | | | | 701/65 |

\* cited by examiner

*Primary Examiner* — Adam Tissot (57) ABSTRACT

A method for modifying a default transmission shift schedule for a vehicle includes monitoring current vehicle parameters and determining future roadway information at a predetermined distance in front of the vehicle. Future vehicle parameters are predicted based on the determined future roadway information. The default transmission shift schedule is modified based on the current vehicle parameters and the predicted future vehicle parameters.

18 Claims, 5 Drawing Sheets

GPS-BASED PREDICTIVE SHIFT SCHEDULE FOR AUTOMATIC TRANSMISSION

TECHNICAL FIELD

This disclosure is related to transmission control in a motor vehicle.

BACKGROUND

The statements in this section merely provide background information related to the present disclosure. Accordingly, such statements are not intended to constitute an admission of prior art.

Transmissions convert torque from one or more spinning shafts into torque on one or more spinning shafts. Transmissions can utilize discrete gear states to accomplish the various torque transmission and conversion functions required. Transmission shifts include a disengagement of a first clutch, interrupting the torque delivered through the transmission, and then an engagement of a second clutch, reestablishing the torque delivered through the transmission. Accordingly, transmission shifts may include an interruption to the torque provided through the transmission creating undesirable drivability and lower overall fuel efficiency for a vehicle.

Increasing numbers of gear states with a broader range are increasingly used to improve engine operating efficiency, e.g., eight-speed automatic transmissions. The speed spans between these gear states becomes narrow with an increasing number of gear ratios. As a consequence, shift busyness has an impact on drivability, especially in hilly regions where road conditions fluctuate.

It is known to use electronic means of tracking vehicle position and coordinating vehicle position with geographic, road, traffic, or other information known in the art. Exemplary accessible electronic means to accomplish such data acquisition includes global position systems (GPS) in conjunction with electronic maps, digital map software using means to track the movement of the vehicle, internet-based wireless, accessible data processing, vehicle to vehicle communications, and vehicle to infrastructure communications and other remote computing resources. For instance, a GPS navigation system and a standard wireless communication module can determine roadway grade and roadway curvature along a roadway.

It is further known to autonomously implement up shifts or shifts according to road conditions. However, such existing methods do not consider operator inputs or operator intent. Accordingly, the existing methods require extensive calibrations and calculations for autonomous up shifts.

SUMMARY

A method for modifying a default transmission shift schedule for a vehicle includes monitoring current vehicle parameters and determining future roadway information at a predetermined distance in front of the vehicle. Future vehicle parameters are predicted based on the determined future roadway information. The default transmission shift schedule is modified based on the current vehicle parameters and the predicted future vehicle parameters.

BRIEF DESCRIPTION OF THE DRAWINGS

One or more embodiments will now be described, by way of example, with reference to the accompanying drawings, in which.

DETAILED DESCRIPTION

Figure 1:
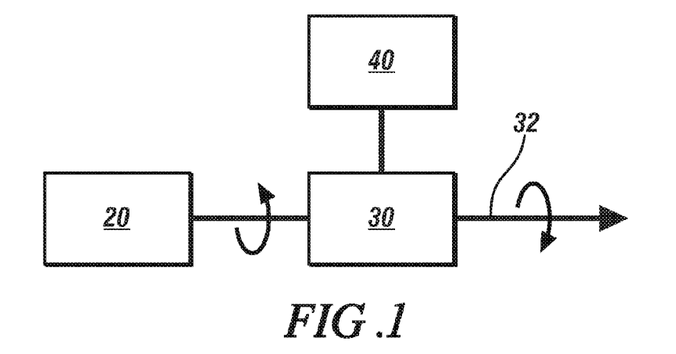
FIG. 1 illustrates an exemplary vehicular powertrain, depicting a relationship between input torque and output torque applied through a transmission, in accordance with the present disclosure.

Referring now to the drawings, wherein the showings are for the purpose of illustrating certain exemplary embodiments only and not for the purpose of limiting the same, FIG. 1 illustrates an exemplary vehicular powertrain, showing a relationship between input torque and output torque applied through a transmission, in accordance with the present disclosure. Vehicle 10 includes an engine 20, a transmission 30, and a transmission control module 40. Under normal operation, including vehicle acceleration, steady state operation, or gradual deceleration, the engine 20 supplies an input torque to the transmission 30, and transmission 30 converts the input torque, through a gear ratio internal to the transmission and, in an automatic transmission, subject to losses associated with operation of a torque converter, into an output torque, powering a driveline 32 of vehicle 10. Under engine braking operation, output torque is converted through transmission 30 as an input torque to engine 20, and frictional and pumping forces within the engine resist or provide back-torque against the output torque. In either vehicle operation described above, the engine 20 provides torque required to meet a torque demand in relation to the output torque. Under a majority of operating conditions, the engine 20 is being used to power the driveline, so while engine braking operation is contemplated as a potential engine operation, the disclosure will discuss generally the engine 20 operating to provide power to the driveline 32. Transmission control module 40 monitors operation of transmission 30 and other inputs from vehicle 10 and issues transmission shift commands to transmission 30 in order to effect transmission shifts.

The effect of output torque upon the driveline 32 is a function of the operational conditions of the vehicle and the road environment on which the vehicle is operating. The magnitude of the output torque determines the magnitude of a propelling force upon the vehicle. The velocity and acceleration of an object are a result of the summation of forces acting upon the object. An object with balanced forces will not experience acceleration (including deceleration, or acceleration in a negative direction). An object with unbalanced forces will accelerate in the direction dictated by the larger force. In addition to propelling force applied by the output torque, a number of other forces act upon a vehicle, including gravitational force, drag force, and frictional forces.

GPS location and digital map technology provide for accurate estimation of vehicle location with respect to road geometry. Predicted routes of the vehicle can be estimated or determined, for example, by analyzing past driving patterns or designated destinations by the operator. Additionally, digital maps are available with accurate details regarding roadway information, such as roadway grade and roadway curvature. The roadway grade, roadway curvature or any other relevant factor representing likely upcoming road conditions can be analyzed as described above through a window of route analysis. In one embodiment, the window of route analysis can include a predetermined distance in front of the vehicle. In another embodiment, the window of analysis can include a look ahead time of travel.

In accordance with the present disclosure, vehicle travel can be predicted including the vehicle's route and speed through the route, and in combinations with other factors, for instance roadway information including roadway grade and roadway curvature, a prediction can be made regarding future vehicle parameters including a future operator pedal position (e.g., upcoming operator torque request) and a future vehicle speed at a predetermined distance in front of the vehicle or at a look ahead time of travel. These predicted vehicle parameters consider what the vehicle operator's intent will be at the predetermined distance in front of the vehicle or at the look ahead time of travel. Accordingly, the predicted vehicle parameters, including the future operator pedal position and the future vehicle speed, can be utilized to modify a default transmission shift schedule or map. Thus, adjustments can be made to shift commands from the default transmission shift schedule based on the predicted vehicle parameters to effectively reflect the vehicle operator's intention due to roadway adaptations at the predetermined distance in front of the vehicle or at a look ahead time of travel. These adjustments provide for a balanced comprise between shift busyness and fuel economy because both up shifts and downshift shifts are considered.

Figure 2:
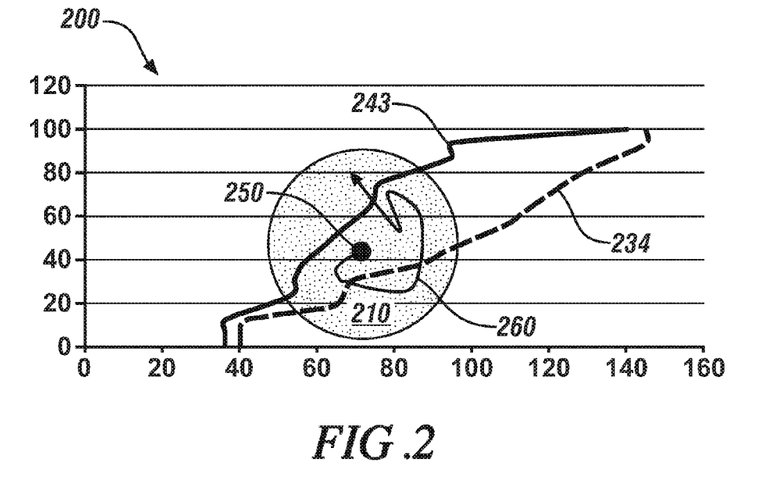
FIG. 2 graphically illustrates an exemplary plot of a default transmission shift schedule for a vehicle, in accordance with the present disclosure.

FIG. 2 graphically illustrates an exemplary plot 200 of a default transmission shift schedule for a vehicle, in accordance with the present disclosure. "Default transmission shift schedule" may be used interchangeably with "default transmission shift map" throughout this disclosure. The horizontal axis denotes vehicle speed (km/h) and the vertical axis denotes operator pedal position (%). It will be understood that the operator pedal position is associated with an operator torque request. The plot 200 illustrates operation of a vehicle within a speed range and includes a first transmission shift command profile 234 illustrating an up shift between third and fourth gears and a second transmission shift command profile 243 illustrating a downshift between fourth and third gears. The default transmission shift schedule can be selected according to a set of operational priorities, for example, maximizing fuel efficiency and emissions control. A speed-torque request profile 260 illustrates the current shift command of the transmission based on the current operator pedal position and the current vehicle speed. Point 250 denotes the current operator pedal position and the current vehicle speed. Area 210 includes a predetermined distance in front of the vehicle or a look ahead time of travel.

Figure 3:
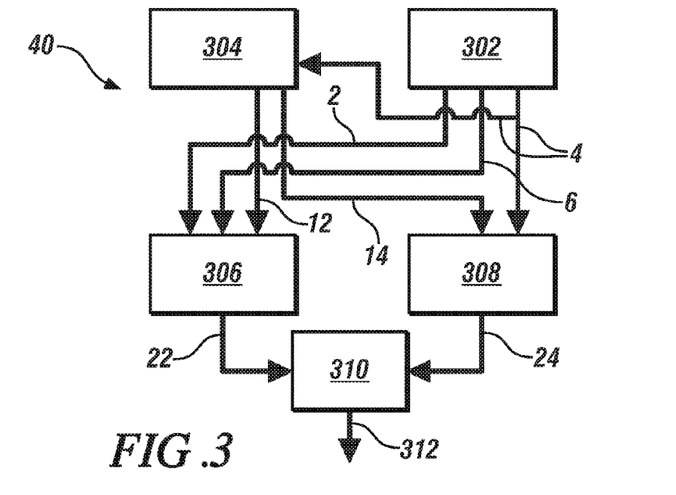
FIG. 3 illustrates a transmission control module of FIG. 1 for modifying a default transmission shift schedule for the vehicle, in accordance with the present disclosure.

FIG. 3 illustrates the transmission control module 40 of FIG. 1 for modifying a default transmission shift schedule for the vehicle, in accordance with the present disclosure. The transmission control module 40 includes a current vehicle parameters module 302, a future roadway information module 304, a predicted operator torque request module 306, a predicted vehicle speed module 308 and a modified shift schedule module 310. The current vehicle parameters module 302 monitors current operator pedal position 2, current vehicle speed 4 and current vehicle acceleration 6. The future roadway information module 304 can determine future roadway information, such as future roadway grade 12 and future roadway curvature 14, through a window of route analysis that can include a predetermined distance in front of the vehicle or a look ahead time of travel. It will be understood that when the vehicle speed 4 and the look ahead time of travel are known, a distance in front of the vehicle can be determined therefrom. For simplicity, the predetermined distance in front of the vehicle will be utilized unless otherwise stated. Further, the future roadway information module 304 can include and/or receive location information selected from, for example, GPS information in conjunction with a 3D map database, Onstar®, vehicle to infrastructure information and vehicle to vehicle information. The module 304 can further analyze past vehicle operator driving patterns to determine the future roadway information 12 and/or 14. The predicted operator torque request module 306 can predict a future operator pedal position (e.g., upcoming operator torque request) 22 based upon the future roadway grade 12 and the current operator pedal position 2 at the predetermined distance in front of the vehicle. Additionally, the predicted operator torque request module 306 can predict the future operator pedal position 22 based upon the future roadway grade 12 at the predetermined distance in front of the vehicle while maintaining the current vehicle acceleration 6. The predicted vehicle speed module 308 can predict a future vehicle speed (e.g., upcoming vehicle speed) 24 at the predetermined distance in front of the vehicle based upon the future roadway curvature 14 and the current vehicle speed 4. In an exemplary embodiment, the predicted future vehicle speed 24 at the predetermined distance in front of the vehicle is empirically derived from the future roadway curvature 14 and a desired lateral acceleration. The desired lateral acceleration can be indicative of a lateral acceleration that does not compromise a comfort level desired by the driver. For instance, and in a non-limiting example, obtained data can dictate that a vehicle operator desires to maintain a vehicle lateral acceleration at 3 m/s$^2$ or less when a turning radius (e.g., roadway curvature) is greater than 100 m, and at 5 m/s$^2$ or less when the turning radius is equal to or less than 100 m. Thus, the desired lateral acceleration can be calibrated according to the future roadway curvature 14. The modified shift schedule module 310 can adjust a transmission shift command (e.g., gear level shift command) 312 from a default transmission shift schedule based on the predicted future operator pedal position 22 and the predicted future vehicle speed 24. Accordingly, the modified shift schedule module 310 adjusts transmission shift commands based on the operator's predicted reactions or intent with respect to future or upcoming changes in roadway information (e.g., roadway grade and roadway curvature), as opposed to autonomously implementing shifts according to road conditions without considering operator inputs or operator intent. Operation and functionality of the modules associated with the transmission control module 40 will be referred to throughout this disclosure for modifying a default transmission shift schedule to increase fuel economy, improve drivability and reduce transmission shift busyness during operation of the vehicle.

Embodiments are envisioned where the future roadway information through the window of route analysis, e.g., the predetermined distance in front of the vehicle, can additionally or alternatively include future roadway information selected from, for example, a future roadway speed limit, a future traffic infrastructure indication and wirelessly communicated live traffic information. The future traffic infrastructure indication can include, but is not limited to, a stop sign, a yield sign, a sharp curve in the road and a stop light. Accordingly, such future roadway information can be implemented into equations to predict the future vehicle speed and/or the future operator torque request through the window of route analysis.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Figure 4:
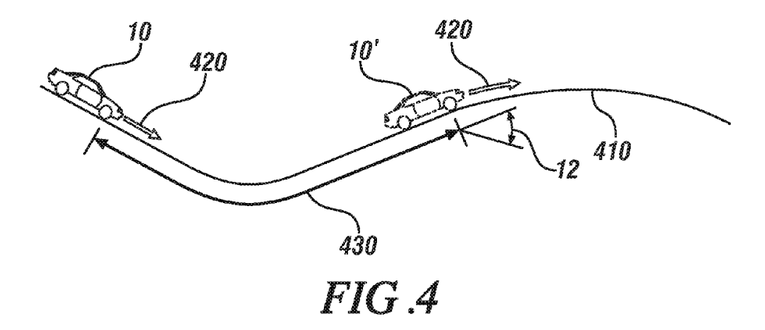
FIG. 4 illustrates an exemplary embodiment of a vehicle travelling along a roadway having a future roadway grade at a predetermined distance in front of the vehicle, in accordance with the present disclosure.

FIG. 4 illustrates an exemplary embodiment of a vehicle 10 travelling along a roadway 410 having a future roadway grade 12 at a predetermined distance 430 in front of the vehicle, in accordance with the present disclosure. Vehicle 10 corresponds to the current position of the vehicle on the roadway 410. The vehicle is travelling at a current speed 420, i.e. current vehicle speed 4 monitored by the current vehicle parameters module 302 of FIG. 3. In a non-limiting example, the current speed 420 is 60 km/h. In association with the transmission control module 40 of FIG. 3, the future operator pedal position (e.g., upcoming operator torque request) 22 can be predicted at the predetermined distance 430 in front of the vehicle where vehicle 10' corresponds to a future or upcoming position on the roadway 410, i.e., the predetermined distance 430. The future roadway information module 302 can utilize GPS information in conjunction with a 3D map database to determine the future roadway grade 12 at the predetermined distance 430 in front of the vehicle 10. Accordingly, vehicle 10' will be positioned on the roadway 410 uphill having the future roadway grade 12. The predicted operator torque request module 306 predicts the future operator pedal position 22 at the predetermined distance 430 in front of the vehicle 10 as follows.

$$a = F(\theta_1) - D(G_1) \quad [1]$$

$$a = F(\theta_2) - D(G_2) \quad [2]$$

wherein F is driving force,
D is drag,
a is the current vehicle acceleration 6,
$\theta_1$ is the current operator pedal position 2,
$G_1$ is a current roadway grade,
$\theta_2$ is the predicted future operator pedal position 22, and
$G_2$ is a current roadway grade.

Hence, the predicted operator torque request module 306 can predict the future operator pedal position 22 at the predetermined distance 430 in front of the vehicle 10 based on the future or upcoming roadway grade 12 while maintaining the current vehicle acceleration 6.

As will become apparent, a vehicle parameter trajectory can be modeled based on current vehicle parameters (e.g., current operator pedal position 2 and current vehicle speed 4) and predicted future vehicle parameters (e.g., predicted future operator pedal position 22 and predicted future vehicle speed 24). The vehicle parameter trajectory can be compared to the default transmission shift schedule. The default transmission shift schedule can be modified based on the comparison.

Figure 5:
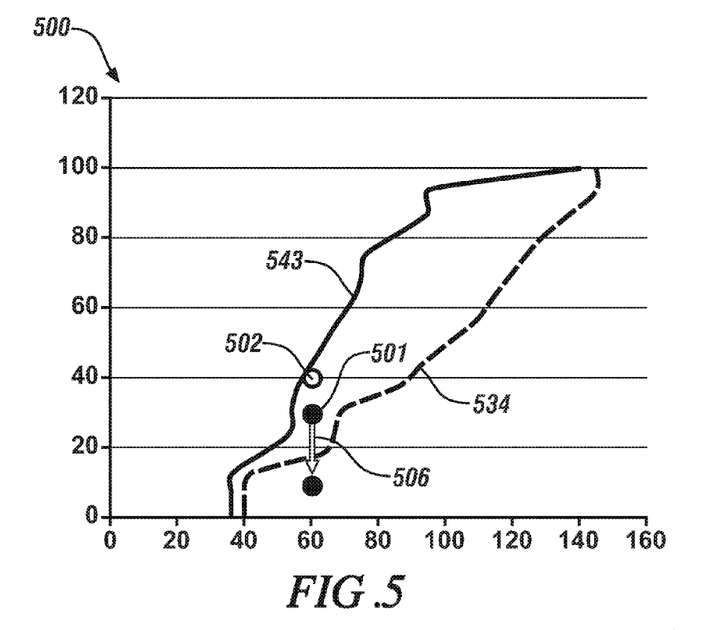
FIG. 5 graphically illustrates an exemplary plot of a default transmission shift schedule depicting the vehicle travelling along the roadway illustrated in FIG. 4, in accordance with the present disclosure.

FIG. 5 graphically illustrates an exemplary plot 500 of a default transmission shift schedule depicting the vehicle 10 travelling along the roadway 410 illustrated in FIG. 4, in accordance with the present disclosure. The horizontal axis denotes vehicle speed (km/h) and the vertical axis denotes operator pedal position (%). It will be understood that the operator pedal position is associated with an operator torque request. The plot 500 illustrates operation of the vehicle 10 travelling along the roadway 410 at the current vehicle speed 420 (e.g., 60 km/h) until the vehicle 10' is located at the predetermined distance 430 in front of the vehicle 10. The plot 500 of the default transmission shift schedule or map includes a first transmission shift command profile 534 illustrating an up shift between third and fourth gears and a second transmission shift command profile 543 illustrating a downshift between fourth and third gears. With reference to FIG. 3, point 501 illustrates the current operator pedal position (e.g., operator torque request) 2 and the current vehicle speed 4, i.e., current vehicle speed 420, of the vehicle 10. It is appreciated that the vehicle is travelling downhill at the current position on the roadway 410, and therefore an operator is likely decreasing the pedal position as indicated by arrow 506. As the operator continues to decrease the pedal position, the default transmission shift schedule would require an up shift from the third gear to the fourth gear because point 501 is likely to traverse the first transmission shift command profile 534 as the vehicle travels on the downhill section of the roadway 410. However, future point 502 illustrates the predicted future operator pedal position (e.g., predicted upcoming operator torque request) 22 at the predetermined distance 430 in front of the vehicle where the future roadway grade 12 is positive indicating the roadway 410 is uphill. It will be appreciated that the operator intends to maintain the current vehicle acceleration at the predetermined distance 430 in front of the vehicle, and therefore it will be assumed that the vehicle speed (e.g., 60 km/h) will not change because the roadway 410 is substantially straight. Thus, the modified shift schedule module 310 of FIG. 3 can model a vehicle parameter trajectory that includes points 501 and 502 for comparison with the plot 500 of the transmission shift schedule.

In the exemplary embodiment illustrated in FIG. 5, the vehicle parameter trajectory including points 501 and 502 may repeatedly traverse the first and second transmission shift command profiles 534 and 543, respectively. To avoid shift busyness and improve vehicle drivability in this example, the modified shift schedule module 310 will avoid an up shift from the third gear to the fourth gear and back to third gear again because the predicted future operator pedal position 22 associated with the future point 502 is in the same region spanned by the first transmission shift command profile 534. Thus, the future point 502 is indicative of a current gear level state. In other words, FIG. 5 demonstrates that the default transmission shift schedule can be modified to prevent any transmission shifts that occur under the default transmission shift schedule if the modeled vehicle parameter trajectory is indicative of a current gear level state.

Figure 6:
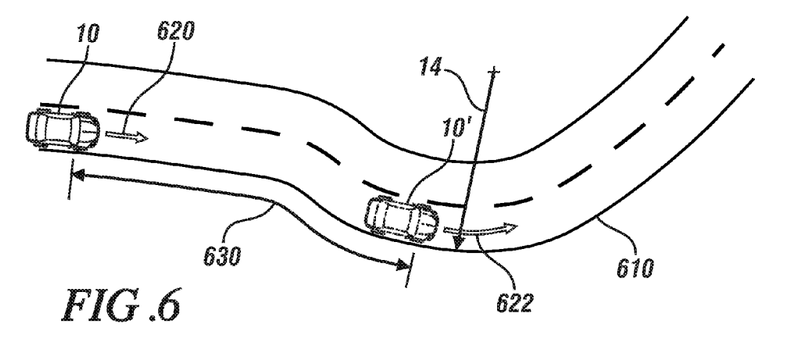
FIG. 6 illustrates an exemplary embodiment of a vehicle travelling along a roadway having a future roadway curvature at a predetermined distance in front of the vehicle, in accordance with the present disclosure.

FIG. 6 illustrates an exemplary embodiment of a vehicle 10 travelling along a roadway 610 having a future roadway curvature 14 at a predetermined distance 630 in front of the vehicle, in accordance with the present disclosure. It will be understood that roadway curvature corresponds to a turning radius. Vehicle 10 corresponds to the current position of the vehicle on the roadway 610. The vehicle is travelling at a current speed 620, i.e. current vehicle speed 4 monitored by the current vehicle parameters module 302 of FIG. 3. In a non-limiting example, the current speed 620 is 70 km/h. In association with the transmission control module 40 of FIG. 3, the future vehicle speed (e.g., upcoming vehicle speed) 24 can be predicted at the predetermined distance 630 in front of the vehicle where vehicle 10' corresponds to a future or upcoming position on the roadway 610, i.e., the predetermined distance 630. The future roadway information module 302 can utilize GPS information in conjunction with a 3D map database to determine the future roadway curvature 14 at the predetermined distance 630 in front of the vehicle 10. Accordingly, vehicle 10' will be positioned on the roadway 610 performing a turning maneuver at the future roadway curvature 14 (e.g., turning radius). The predicted vehicle speed module 308 predicts the future vehicle speed 24 at the predetermined distance 630 in front of the vehicle 10 as follows.

$$\hat{v} = f(\vec{a}, C) \quad [3]$$

$$\vec{a} = \hat{v}^2 \cdot C \quad [4]$$

wherein $\vec{a}$ is the desired lateral acceleration

C is the future roadway curvature 14, and $\hat{v}$ is the predicted future vehicle speed 24.

Hence, the predicted vehicle speed module 308 can predict the future vehicle speed 24 at the predetermined distance 630 in front of the vehicle 10 based on the future or upcoming roadway curvature 14, wherein the predicted future vehicle speed 24 is empirically derived from the future roadway curvature and the desired lateral acceleration, $\vec{a}$. The desired lateral acceleration can be indicative of a lateral acceleration that does not compromise a comfort level desired by the driver. As aforementioned, obtained data can dictate that a vehicle operator desires to maintain a vehicle lateral acceleration at 3 m/s² or less when a turning radius (e.g., roadway curvature) is greater than 100 m, and at 5 m/s² or less when the turning radius is equal to or less than 100 m. Thus, the desired lateral acceleration can be calibrated according to the future roadway curvature 14. Accordingly, the predicted future vehicle speed 622 in FIG. 6 can be determined utilizing Equations [3] and [4]. It will be understood that the vehicle operator will be required to reduce the vehicle speed at the future roadway curvature 14 in order to achieve the desired lateral acceleration. In a non-limiting example, the predicted future vehicle speed 622 is 45 km/h.

Figure 7:
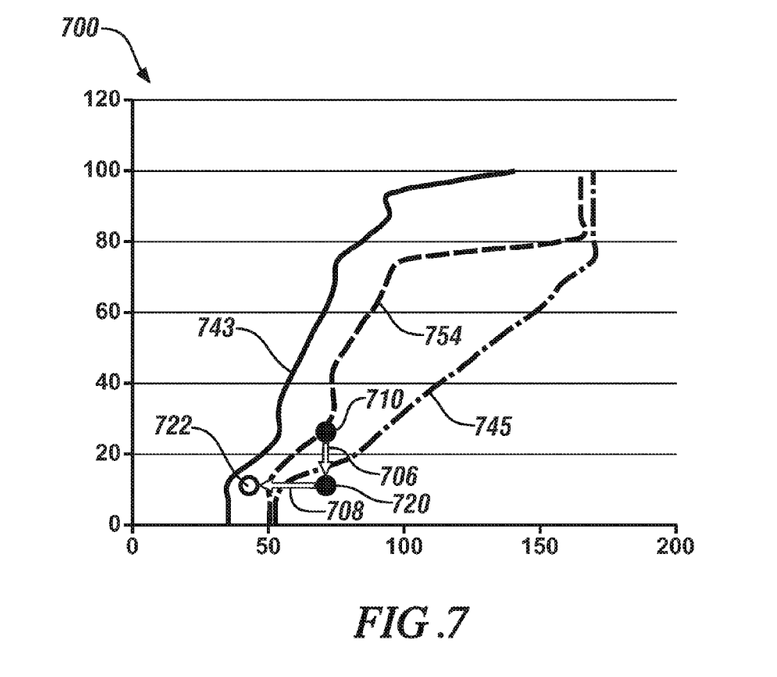
FIG. 7 graphically illustrates an exemplary plot of a default transmission shift schedule depicting the vehicle travelling along the roadway of FIG. 6, in accordance with the present disclosure.

FIG. 7 graphically illustrates an exemplary plot 700 of a default transmission shift schedule depicting the vehicle 10 travelling along the roadway 610 of FIG. 6, in accordance with the present disclosure. The horizontal axis denotes vehicle speed (km/h) and the vertical axis denotes operator pedal position (%). It will be understood that the operator pedal position is associated with an operator torque request. The plot 700 illustrates operation of the vehicle 10 travelling along the roadway 610 at the current vehicle speed 620 (e.g., 70 km/h) until the vehicle 10' is located at the predetermined distance 630 in front of the vehicle 10 with the reduced vehicle speed 622 (e.g., predicted future vehicle speed 24). The plot 700 of the default transmission shift schedule or map includes a first transmission shift command profile 745 illustrating an up shift between fourth and fifth gears, a second transmission shift command profile 754 illustrating a downshift between fifth and fourth gears, and a third transmission shift command profile 743 illustrating a downshift between fourth and third gears. With reference to FIG. 3, point 710 illustrates the current operator pedal position (e.g., operator torque request) 2 and the current vehicle speed 4, i.e., current vehicle speed 620, of the vehicle 10. It is appreciated that the vehicle operator is likely anticipating the future roadway curvature of the roadway 610, and therefore the operator likely decreased the pedal position as indicated by arrow 706. The default transmission shift schedule would require an up shift from the fourth gear to the fifth gear because point 720 has traversed the first transmission shift command profile 745. However, future point 722 illustrates the predicted future vehicle speed 24 at the predetermined distance 630 in front of the vehicle where the future roadway curvature 14 is located. It will be appreciated that the operator has reduced the speed of the vehicle, as indicated by arrow 708, by maintaining the current pedal position 2, and therefore it will be assumed that current operator pedal position 2 will not change as the vehicle operator performs the turning maneuver at the future roadway curvature 14. Thus, the modified shift schedule module 310 of FIG. 3 can model a vehicle parameter trajectory that includes points 720 and 722 for comparison with the plot 700 of the default transmission shift schedule.

In the exemplary embodiment illustrated in FIG. 7, the modeled vehicle parameter trajectory including points 710 and 722 will traverse the second transmission shift command profile 754 at the predetermined distance. Accordingly, the modified shift schedule module 720 will prevent the possible upshift from the fourth gear to the fifth gear (e.g., prevent traversing the first transmission shift command profile 745) because the predicted future vehicle speed 24 associated with the future point 722 traverses the second transmission shift command profile 754. In other words, FIG. 7 demonstrates that the default transmission shift schedule can be modified to avoid shift busyness if the modeled vehicle parameter trajectory traverses a transmission up shift command of the default transmission shift schedule back and forth.

Figure 8:
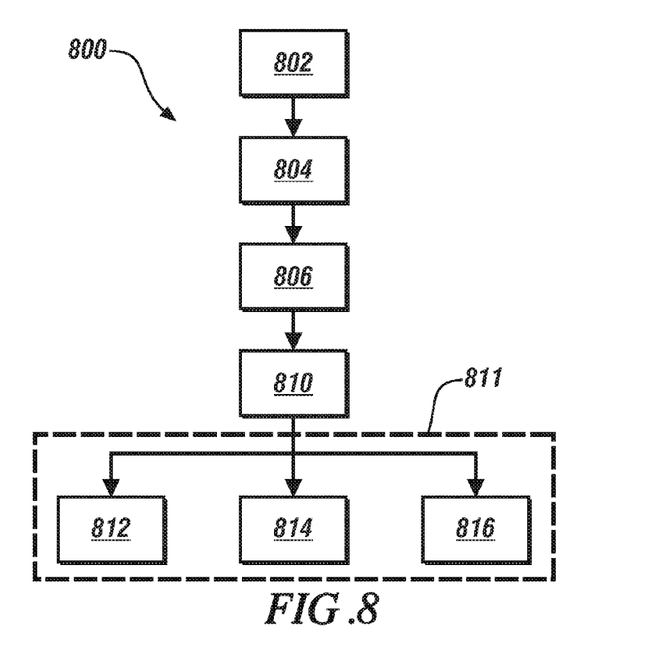
FIG. 8 illustrates a flow chart for modifying a default transmission shift schedule for a vehicle, in accordance with the present disclosure.

In an exemplary embodiment, FIG. 8 illustrates a flowchart 800 for modifying a default transmission shift schedule for a vehicle utilizing the transmission control module 40 of FIGS. 1 and 3, in accordance with the present disclosure. Table 1 is provided as a key to FIG. 8 wherein the numerically labeled blocks and the corresponding functions are set forth as follows.

TABLE 1

| BLOCK | BLOCK CONTENTS |
|---|---|
| 802 | Monitoring a current operator torque request, a current vehicle speed and a current vehicle acceleration. |
| 804 | Determining upcoming roadway grade and upcoming |

TABLE 1-continued

| BLOCK | BLOCK CONTENTS |
|---|---|
| | roadway curvature through a window of route analysis. |
| 806 | Predicting an upcoming operator torque request through the window of route analysis based on the upcoming roadway grade and the current vehicle acceleration. |
| 810 | Predicting an upcoming vehicle speed through the window of route analysis based on the upcoming roadway curvature, a desired lateral acceleration, and the current vehicle speed. |
| 811 | Adjusting a gear level shift command from the default transmission shift map for the vehicle based on the predicted upcoming operator torque request and the predicted upcoming vehicle speed. |
| 812 | Avoiding execution of any gear level shifts under the default transmission shift map if the predicted upcoming operator torque request and the predicted upcoming vehicle speed are indicative of a current gear level state. |
| 814 | Executing an early downshift under the default transmission shift map if the predicted upcoming operator torque request and the predicted upcoming vehicle speed are indicative of a gear level downshift. |
| 816 | Executing an early up shift under the default transmission shift map if the predicted upcoming operator torque request and the predicted upcoming vehicle speed are indicative of a gear level up shift command. |

The flowchart 800 utilizes the aforementioned transmission control module 40 of FIGS. 1 and 3. The flowchart 800 starts at block 802 and utilizes the current vehicle parameters module 302 to monitor a current operator torque request (e.g., current operator pedal position 2), a current vehicle speed 4 and a current vehicle acceleration 6. The flowchart 800 proceeds to block 804 and utilizes the future roadway information module 304 to determine upcoming roadway grade (e.g., future roadway grade 12) and upcoming roadway curvature (e.g., future roadway curvature 14) through a window of route analysis. In one embodiment, the window of route analysis includes a predetermined distance in front of the vehicle. In another embodiment, the window of route analysis includes a look ahead time of travel. The upcoming roadway grade and the upcoming roadway curvature can be determined based on GPS information and/or wireless communication information in conjunction with at least one of a 3D map database and analysis of past vehicle operator driving patterns. Alternative embodiments may determine the upcoming roadway grade and the upcoming roadway curvature based on location information selected from, for example, analyzed past driving patterns, Onstar®, vehicle to infrastructure information and vehicle to vehicle information.

At block 806, the flowchart 800 utilizes the predicted operator torque request module 306 to predict an upcoming operator torque request (e.g., predicted future operator pedal position 22) through the window of route analysis based on the upcoming roadway grade and the current vehicle acceleration. For example, the predicted upcoming operator torque request may maintain the current vehicle acceleration request through the window of route analysis. The upcoming operator torque request may be predicted utilizing Equations [1] and [2]. In an exemplary embodiment, the flowchart proceeds to block 810, however, the flowchart 800 may perform the functions of block 810 prior to block 806 or concurrently with block 806.

At block 810, the flowchart 800 utilizes the predicted vehicle speed module 308 to predict an upcoming vehicle speed (e.g., predicted future vehicle speed 24) through the window of route analysis based on the upcoming roadway curvature (e.g., future roadway curvature 14) and a desired lateral acceleration. The desired lateral acceleration may be calibrated or analyzed based on the past data recorded according to roadway curvature. As aforementioned, the predicted upcoming vehicle speed through the window of route analysis can be empirically derived utilizing Equations [3] and [4].

At block 811, the flowchart 800 utilizes the modified shift schedule module 310 to adjust a gear level shift command from a default transmission shift map for the vehicle based on the predicted upcoming operator torque request and the predicted upcoming vehicle speed. Specifically, the predicted upcoming operator torque request and the predicted upcoming vehicle speed are compared to the default transmission shift map. The default transmission shift map can include a look-up table mapping at least one gear level up shift command at least one gear level downshift command based on operator torque requests at given vehicle speeds. An up shift corresponds to a gear level shift command to an operating mode having a lower numerical multiplication ratio and a downshift corresponds to a gear level shift command to an operating mode having a higher numerical multiplication ratio. The adjusting the gear level shift command from the default transmission shift map for the vehicle can include one of three scenarios in blocks 812, 814 and 816.

As aforementioned, the modified default transmission shift map can include modeling a vehicle parameter trajectory based on the current vehicle parameters and the predicted future/upcoming vehicle parameters. The vehicle parameter trajectory is compared to the default transmission shift map. The default transmission shift map can be modified based on the comparing. Accordingly, block 811 may utilize the modified shift schedule module 310 to adjust a gear level shift command from the default transmission shift map for the vehicle based on the modeled vehicle parameter trajectory.

At block 812, execution of any gear level shifts is avoided under the default transmission shift map if the predicted upcoming operator torque request and the predicted upcoming vehicle speed are indicative of a current gear level state. In other words, any transmission shifts that occur under the default transmission shift map are prevented if the modeled vehicle parameter trajectory is indicative of the current gear level state. Accordingly, even if the default transmission shift map would dictate multiple gear level shifts according to the current vehicle parameters, up shifts and/or downshifts are prevented if the modeled vehicle parameter trajectory though the window of route analysis is indicative of a shift back to the current gear state, and thus, shift business is prevented. It will be understood that the prevented gear level shifts can include preventing up and/or down shifts dictated by the default transmission shift map.

At block 814, an early downshift is executed under the default transmission shift map if the predicted upcoming operator torque request and the predicted upcoming vehicle speed are indicative of a gear level downshift command. In other words, an early downshift that occurs under the default transmission shift map is commanded if the modeled vehicle parameter trajectory is indicative of a transmission downshift command of the default transmission shift schedule. It will be appreciated that the early downshift is commanded only if the modeled vehicle parameter trajectory through the window of route analysis is not indicative of a future up shift that is subsequent to the early downshift.

At block 816, an early up shift is executed under the default transmission shift map if the predicted upcoming operator torque request and the predicted upcoming vehicle speed are indicative of a gear level up shift. In other words, an early up shift that occurs under the default transmission shift map is commanded if the modeled vehicle parameter trajectory is indicative of a transmission up shift command of the default transmission shift map. It will be appreciated that the early up shift is commanded only if the modeled vehicle parameter trajectory through the window of route analysis is not indicative of a future downshift shift that is subsequent to the early up shift.

Figure 9:
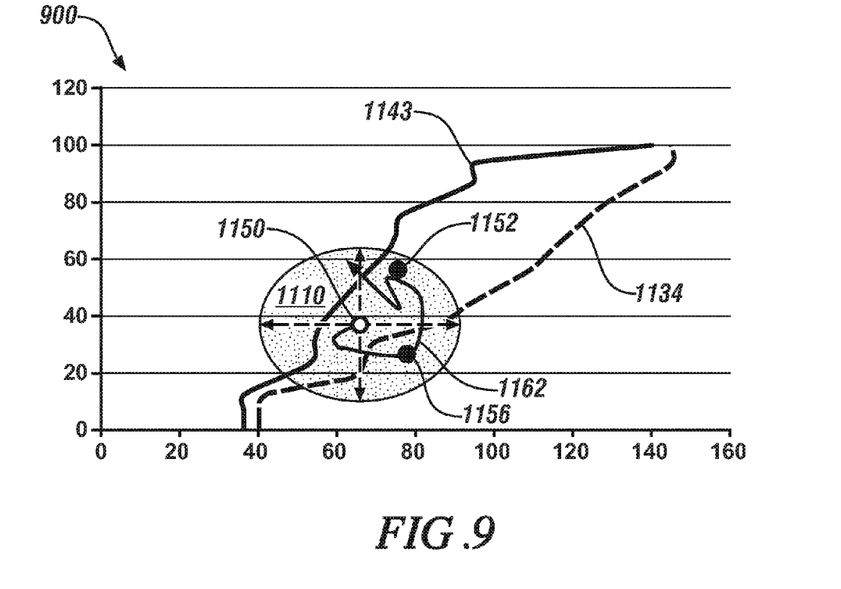
FIGS. 9-11 graphically illustrate an exemplary plot of a default transmission shift schedule for a vehicle, in accordance with the present disclosure.
Figure 10:
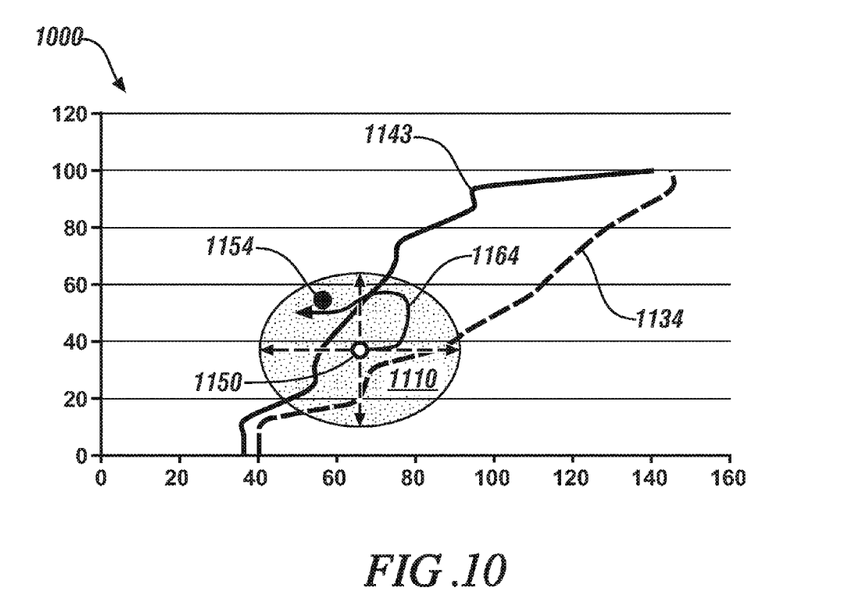
Figure 11:
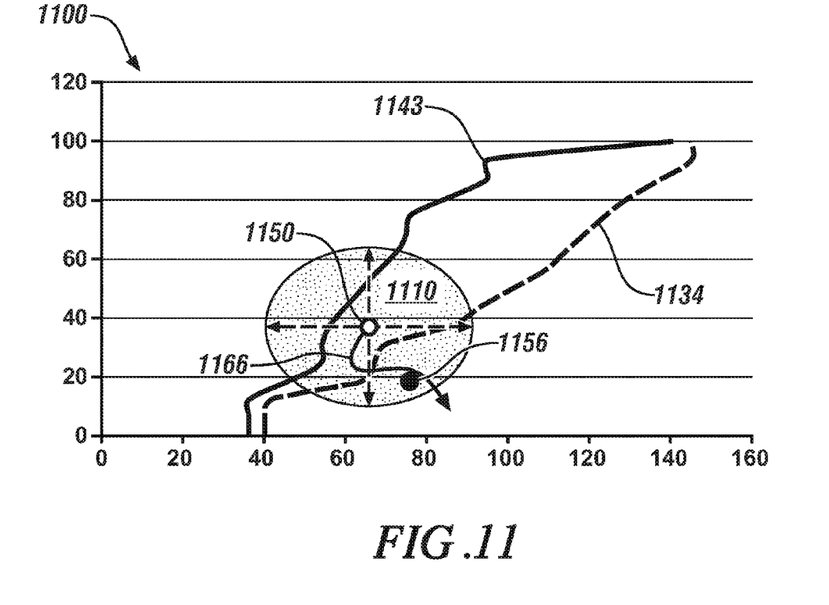

Referring to FIGS. 9-11, each of the plots 900, 1000 and 1100 illustrate a default transmission shift map for a vehicle, in accordance with the present disclosure. The horizontal axis denotes vehicle speed (km/h) and the vertical axis denotes operator pedal position (%). It will be understood that the operator pedal position is associated with an operator torque request. The default transmission shift map illustrates operation of the vehicle within a speed range and includes a first gear level shift command 1134 illustrating an up shift between third and fourth gears and a second gear level shift command 1143 illustrating a downshift between fourth and third gears. Point 1150 denotes the current operator pedal position and the current vehicle speed.

Area 1110 includes a window of route analysis that can include a predetermined distance in front of the vehicle or a look ahead time of travel. Predicted upcoming speed-torque request trajectories 1162, 1164, 1166 illustrate trajectories of predicted upcoming operator torque request and predicted upcoming vehicle speed. It will be understood that each speed-torque request trajectory is indicative of the modeled vehicle parameter trajectory discussed above.

Referring to plot 900 of FIG. 9, a predicted upcoming speed-torque request trajectory 1162 starting from the current point 1150 includes all possible upcoming points through the window of route analysis, e.g., points 1156 and 1152. With reference to block 811 of FIG. 8, comparing the predicted upcoming speed-torque request trajectory 1162 to the default transmission shift map indicates a gear level up shift from point 1150 to point 1156 followed by an immediate down shift from point 1156 to point 1152, and therefore block 812 avoids execution of any gear level shifts to prevent shift business through the window of route analysis within area 1110.

Referring to plot 1000 of FIG. 10, a predicted upcoming speed-torque request trajectory 1164 starting from the current point 1150 includes all possible upcoming points through the window of route analysis, e.g., point 1154. With reference to block 811 of FIG. 8, comparing the predicted upcoming speed-torque request trajectory 1164 to the default transmission shift map is indicative of a gear level downshift command when the predicted upcoming speed-torque request trajectory 1164 transverses the second gear level shift command 1143, and therefore block 814 executes an early downshift. Modifying the gear level shift command to execute an early downshift achieves increased drivability.

Referring to plot 1100 of FIG. 11, a predicted upcoming speed-torque request trajectory 1166 starting from the current point 1150 includes all possible upcoming points through the window of route analysis, e.g., point 1156. With reference to block 811 of FIG. 8, comparing the predicted upcoming speed-torque request trajectory 1166 to the default transmission shift map is indicative of a gear level up shift command when the upcoming speed-torque request trajectory 1166 transverses the first gear level shift command 1143, and therefore block 814 executes an early up shift. Modifying the gear level shift command to execute an early up shift achieves increased fuel economy.

Figure 12:
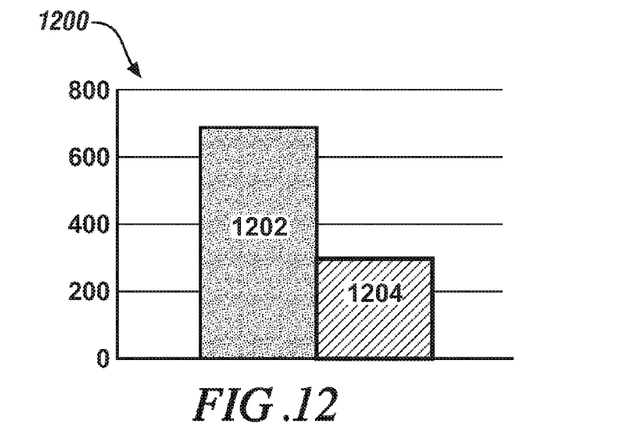
FIG. 12 graphically illustrates simulated data depicting a number of gear shifts within a transmission during a traveled route of a vehicle along a roadway utilizing a default transmission shift schedule and a modified default transmission shift schedule, in accordance with the present disclosure.

FIG. 12 graphically illustrates simulated data depicting a number of gear shifts within a transmission during a traveled route of a vehicle along a roadway utilizing a default transmission shift schedule and a modified default transmission shift schedule, in accordance with an exemplary embodiment of the present disclosure. The exemplary roadway is 36 miles long, having roadway grade uniformly distributed between 0 and 8.0 percent and roadway curvature uniformly distributed between 0 and $\frac{1}{15}$ meters. The vertical axis denotes the number of gear shifts during the traveled route of the vehicle along the roadway. Bar 1202 represents the vehicle utilizing a default transmission shift schedule. Bar 1204 represents the vehicle utilizing a modified default transmission shift schedule as performed by the exemplary transmission control module 40 of FIG. 3. It is appreciated, that only 296 shifts are performed during the traveled route utilizing the modified default transmission shift schedule based on the current vehicle parameters and the predicted future vehicle parameters, i.e., predicted future operator pedal input and predicted future vehicle speed. In contrast, without the predicted future vehicle parameters that take into account an operator's intent due to future roadway information, i.e., future roadway grade and future roadway curvature, are not of consideration, the default transmission shift schedule performs 703 total shifts during the traveled route of the vehicle along the roadway.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for modifying a default transmission shift schedule for a vehicle, comprising:
monitoring current vehicle parameters including a current operator pedal position and a current vehicle speed;
determining future roadway information at a predetermined distance in front of the vehicle;
predicting future vehicle parameters at the predetermined distance in front of the vehicle, including;
predicting a future operator pedal position based upon the determined future roadway information, the current operator pedal position, and a predicted operator response to the determined future roadway information; and
predicting a future vehicle speed based upon the determined future roadway information, the current vehicle speed, and a predicted operator response to the determined future roadway information, the predicted operator response to the determined future roadway information including a desired lateral acceleration, indicative of a lateral acceleration that does not compromise a desired comfort level of a vehicle operator, such that operation at the predicted future vehicle speed would not result in the vehicle exceeding the desired lateral acceleration;
modifying the default transmission shift schedule based on the current vehicle parameters and the predicted future vehicle parameters, including both the predicted future operator pedal position and the predicted future vehicle speed based upon the predicted operator response to the determined future roadway information, comprising;
modeling a vehicle parameter trajectory based on the current vehicle parameters and the predicted future vehicle parameters;
comparing the vehicle parameter trajectory to the default transmission shift schedule and identifying gear level shifts that will occur in achieving the modeled vehicle parameter trajectory with the default transmission shift schedule; and modifying the default transmission shift schedule based on the identified gear level shifts which the modeled vehicle parameter trajectory is indicative of.

2. The method of claim 1 wherein the future roadway information is based on location information selected from the group consisting of: GPS information in conjunction with a 3D map database, analyzed past driving patterns, Onstar® information, vehicle to infrastructure information and vehicle to vehicle information.

3. The method of claim 1 wherein the future roadway information comprises roadway grade and roadway curvature.

4. The method of claim 1 wherein the future roadway information is selected from the group consisting of: a roadway speed limit, a traffic infrastructure indication and wirelessly communicated live traffic information.

5. The method of claim 1 wherein the predicting future vehicle parameters further comprises:
    predicting a future operator pedal position at the predetermined distance in front of the vehicle based upon a future roadway grade at the predetermined distance in front of the vehicle.

6. The method of claim 5 further comprising:
    monitoring a current vehicle speed, a current vehicle acceleration and a current operator pedal position; and
    wherein predicting the future operator pedal position is further based upon the current operator pedal position while maintaining the current vehicle acceleration.

7. The method of claim 1 wherein predicting the future vehicle parameters further comprises:
    predicting a future vehicle speed at the predetermined distance in front of the vehicle based upon future roadway curvature at the predetermined distance ahead of the vehicle.

8. The method of claim 7 wherein the predicted future vehicle speed is empirically derived from the future roadway curvature at the predetermined distance in front of the vehicle and a desired lateral acceleration.

9. The method of claim 1 wherein modifying the default transmission shift schedule, based on the identified gear level shifts which the modeled vehicle parameter trajectory is indicative of, comprises one of:
    preventing any transmission shifts that occur under the default transmission shift schedule if the modeled vehicle parameter trajectory is indicative of a current gear level state;
    commanding an early down shift that occurs under the default transmission shift schedule if the modeled vehicle parameter trajectory is indicative of a transmission downshift command of the default transmission shift schedule; and
    commanding an early up shift under the default transmission shift schedule if the modeled vehicle parameter trajectory is indicative of a transmission up shift command of the default transmission shift schedule.

10. Method for updating a default transmission shift map for a vehicle, comprising:
    monitoring a current operator torque request, a current vehicle speed and a current vehicle acceleration;
    determining upcoming roadway grade and upcoming roadway curvature through a window of route analysis based on GPS information in conjunction with one of a 3D map database and analysis of past vehicle operator driving patterns;
    predicting an upcoming operator torque request through the window of route analysis based on the upcoming roadway grade, the current operator torque request, the current vehicle acceleration, and a predicted operator response to the determined future roadway information;
    predicting an upcoming vehicle speed through the window of route analysis based on the upcoming roadway curvature and a desired lateral acceleration, indicative of a lateral acceleration that does not compromise a desired comfort level of the vehicle operator, such that operation at the predicted upcoming vehicle speed would not result in the vehicle exceeding the desired lateral acceleration; and
    adjusting a gear level shift command from the default transmission shift map for the vehicle based on the predicted upcoming operator torque request and the predicted upcoming vehicle speed, predicted based upon the predicted operator response to the determined future roadway information, comprising;
        modeling a vehicle parameter trajectory based on the current operator torque request, the current vehicle speed and the current vehicle acceleration, and the predicted upcoming operator torque request and the predicted upcoming vehicle speed;
        comparing the vehicle parameter trajectory to the default transmission shift map and identifying gear level shifts that will occur in achieving the modeled vehicle parameter trajectory with the default transmission shift schedule; and
        adjusting the gear level shift command from the default transmission shift map for the vehicle based on the identified gear level shifts which the modeled vehicle parameter trajectory is indicative of.

11. The method of claim 10 wherein the window of route analysis comprises a predetermined distance in front of the vehicle.

12. The method of claim 10 wherein the window of route analysis comprises a look ahead time of travel.

13. The method of claim 10 wherein the desired lateral acceleration is calibrated according to roadway curvature.

14. The method of claim 10 wherein the operator torque request comprises a operator position of an accelerator pedal.

15. The method of claim 10 wherein the default transmission shift map comprises a look-up table mapping at least one gear level up shift command and at least one gear level downshift command based on operator torque requests at given vehicle speeds.

16. The method of claim 10 wherein adjusting the gear level shift command comprises:
    executing an early up shift under the default transmission shift map if the predicted upcoming operator torque request and the predicted upcoming vehicle speed are indicative of a gear level up shift command.

17. The method of claim 10 wherein adjusting the gear level shift command comprises:
    executing an early downshift under the default transmission shift map if the predicted upcoming operator torque request and the predicted upcoming vehicle speed are indicative of a gear level downshift command.

18. The method of claim 10 wherein adjusting the gear level shift command comprises:
    avoiding execution of any gear level shifts under the default transmission shift schedule if the predicted upcoming operator torque request and the predicted upcoming vehicle speed are indicative of a current gear level state.

* * * * *